United States Patent
Soma et al.

(10) Patent No.: US 11,388,270 B1
(45) Date of Patent: Jul. 12, 2022

(54) AUTO-NEGOTIATION WITH PARALLEL DETECTION ARCHITECTURE FOR DIFFERENT DATA RATES

(71) Applicant: Xilinx, Inc., San Jose, CA (US)

(72) Inventors: Veerender Kumar Soma, Hyderabad (IN); Ajay V. Sharma, Hyderabad (IN); Sunil K. Pattanaik, Hyderabad (IN)

(73) Assignee: Xilinx, Inc., San Jose, CA (US)

( * ) Notice: Subject to any disclaimer, the term of this patent is extended or adjusted under 35 U.S.C. 154(b) by 582 days.

(21) Appl. No.: 16/401,099

(22) Filed: May 1, 2019

(51) Int. Cl.
    *H04L 12/26* (2006.01)
    *H04L 69/24* (2022.01)
    *H04L 69/28* (2022.01)
    *H04L 69/18* (2022.01)

(52) U.S. Cl.
    CPC .............. *H04L 69/24* (2013.01); *H04L 69/18* (2013.01); *H04L 69/28* (2013.01)

(58) Field of Classification Search
    None
    See application file for complete search history.

(56) References Cited

U.S. PATENT DOCUMENTS

| | | | | |
|---|---|---|---|---|
| 9,887,880 | B1* | 2/2018 | Lo ...................... | H04L 41/0866 |
| 2015/0341284 | A1* | 11/2015 | Kang ................... | H04L 47/805 |
| | | | | 455/513 |
| 2016/0164736 | A1* | 6/2016 | Lusted ................ | H04L 41/0886 |
| | | | | 370/254 |
| 2016/0182175 | A1* | 6/2016 | Landau ................ | H04L 12/12 |
| | | | | 370/514 |

OTHER PUBLICATIONS

Xilinx, Inc.,"1G/10G/25G Switching Ethernet Sybsystem, v.2.1," LogiCORE IP Product Guide,Vivado Design Suiste, PG292 Jun. 6, 2018, pp. 1-139, San Jose, CA USA.

Wikipedia, "Autonegotiation," [online] the Free Encyclopedia, Sep. 28, 2018, retrieved from the Internet: <https://en.wikipedia.org/w/index.php?title=Autonegotiation&oldid=861625474>, 6 pgs.

* cited by examiner

*Primary Examiner* — Zewdu A Beyen
(74) *Attorney, Agent, or Firm* — Kevin T. Cuenot

(57) ABSTRACT

A physical (PHY) circuit can include a Physical Medium Dependent (PMD) circuit, the PMD circuit having a receiver and a transmitter, a Physical Medium Attachment (PMA) circuit coupled to the PMD circuit, and a plurality of Physical Coding Sublayer (PCS) circuits coupled to the PMA circuit, wherein each PCS circuit is configured to implement a different communication protocol. The PHY circuit can also include an auto-negotiation circuit coupled to the PMD circuit, wherein the auto-negotiation circuit is configured to determine a selected communication protocol compatible with a link partner device from a plurality of communication protocols by configuring the receiver to operate at different data rates over time, the different data rates corresponding to different ones of the plurality of communication protocols.

20 Claims, 8 Drawing Sheets

AUTO-NEGOTIATION WITH PARALLEL DETECTION ARCHITECTURE FOR DIFFERENT DATA RATES

TECHNICAL FIELD

This disclosure relates to integrated circuits (ICs) and, more particularly, to establishing communication links using auto-negotiation with parallel detection in ICs.

BACKGROUND

Ethernet is a computer network architecture that includes various specified local-area network (LAN) protocols, devices, and connection methods. Ethernet is used, for example, to implement LANs and metropolitan area networks (MANs) and to implement data storage applications, automotive applications, and within and between integrated circuits. Ethernet is defined in the IEEE 802.3 standard.

IEEE 802.3, section 5, Clause 73 (CL73) defines an auto-negotiation feature for establishing communication links between two link partners at the highest possible data rate and with the most available capabilities. CL73 also supports parallel detection to connect to legacy devices that do not support auto-negotiation. For example, CL73 defines a finite state machine (FSM) that supports auto-negotiation arbitration and parallel detection. CL73 specifies transmission of a differential Manchester encoded (DME) page where the finite state machine reaches AN GOOD CHECK. When the FSM reaches a state referred to as the ability detect state, the FSM looks for link_status_[KX] for 1G Base-KX and similar protocols, link_status_[KX4] for 10G Base-KX4 and similar protocols, and ability match for 10G Base-KR and similar protocols in parallel.

SUMMARY

In one aspect, a physical (PHY) circuit can include a Physical Medium Dependent (PMD) circuit, the PMD circuit having a receiver and a transmitter, a Physical Medium Attachment (PMA) circuit coupled to the PMD circuit, and a plurality of Physical Coding Sublayer (PCS) circuits coupled to the PMA circuit, wherein each PCS circuit is configured to implement a different communication protocol. The PHY circuit can also include an auto-negotiation circuit coupled to the PMD circuit, wherein the auto-negotiation circuit is configured to determine a selected communication protocol compatible with a link partner device from a plurality of communication protocols by configuring the receiver to operate at different data rates over time, the different data rates corresponding to different ones of the plurality of communication protocols.

In another aspect, a method of establishing a communication link can include configuring a receiver to operate at a first data rate corresponding to a first communication protocol of a plurality of communication protocols and connecting a first Physical Coding Sublayer (PCS) circuit to the receiver, monitoring for receipt of a DME page by the receiver during a first time window corresponding to the first communication protocol using the first PCS circuit, in response to expiration of the first time window without detecting a differential Manchester encoded (DME) page, configuring the receiver to operate at a second data rate corresponding to a second communication protocol of the plurality of communication protocols and connecting a second PCS circuit corresponding to the second communication protocol to the receiver, and monitoring for a SYNC received by the receiver during a second time window corresponding to the second communication protocol using the second PCS circuit.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
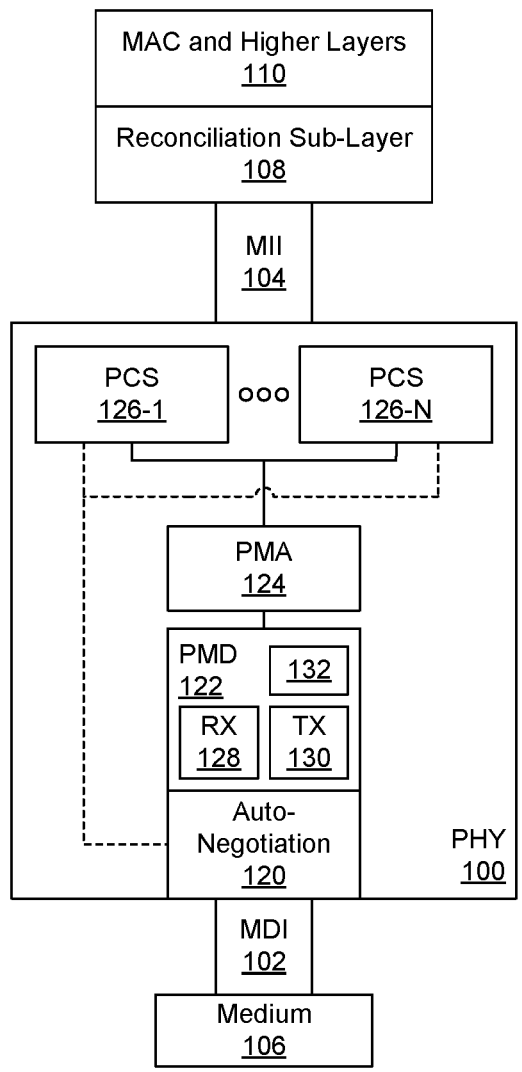
FIG. 1 illustrates an example of a system for auto-negotiation.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to establishing communication links using auto-negotiation with parallel detection in ICs. IEEE 802.3, section 5, Clause 73 (hereafter "CL73") defines an auto-negotiation feature for establishing communication links between two link partners at the highest possible data rate and with the most available capabilities. CL73 also supports parallel detection to connect to legacy devices that do not support auto-negotiation.

Some conventional techniques for implementing CL73 functionality use independent lanes for each of the different Physical Coding Sublayer (PCS) types that are supported. The physical layer (PHY) effectively duplicates the PCS circuit, the Physical Medium Attachment (PMA) circuit, and the Physical Medium dependent (PMD) circuit for each different supported PCS type. In an example implementation, the PHY would include one PCS circuit, one PMA circuit, and one PMD circuit for 1000BASE-KX; another PCS circuit, another PMA circuit, and another PMD circuit for 10GBASE-KX4, and so on. As can be seen, this approach requires significant IC resources to implement due to the replication of the entire data lane in the PHY across each of the supported PCS types.

Other conventional techniques use multiple PMD circuits and multiple PCS circuits with a single PMA circuit. Information received from the PMA circuit (e.g., from the multiple PMD circuits) is translated into a format that is understandable to subsequent PCS layers. In this case, each of the PCS circuits included in the system (e.g., a 1000BASE-KX PCS circuit, a 10G-BASE-KX4 PCS circuit, etc.) checks the link status in parallel with the PMA circuit block. In such implementations, the PMA circuit does not operate at the native (e.g., protocol) speed as the PMD circuits do not have the capability to switch among the available speeds of the supported PCS types. This implementation requires extra hardware to decode the single line rate serial data to recreate properly formed PCS data across the different PCS circuits. The additional hardware, or "adapter circuitry," is needed for each supported PCS type (e.g., or data rate) to handover the data from the PMA data rate to a selected PCS operating at a different data rate. As new data rates and/or additional PCS types are supported, the PHY must be augmented with additional adapter circuitry. Otherwise, usage of PCS IPs implementing a PHY solution in user circuit designs, if unmodified, will be restricted. Updating the PCS IPs to include adapter circuitry for additional supported PCS types, however, means that the PCS IPs continue to grow in size and complexity while consuming larger amounts of IC resources.

In accordance with the inventive arrangements described within this disclosure, a system is disclosed that is capable of implementing CL73 with parallel detection. The system is capable of supporting multiple communication data rates using a lane that includes a single PMA circuit and a single PMD circuit. The example implementations described within this disclosure maintain compliance with CL73 while also reducing the amount of IC resources (e.g., circuitry and/or logic) that is used.

The system is capable of detecting legacy devices that utilize differential Manchester encoded (DME) decoding by detecting such devices using a serial technique without losing compliance with CL73. In an example implementation, multi-gigabit transceivers (MGTs) may be used to implement the PMD circuit. The MGTs may be dynamically configured to support serial line protocol changes. The underlying PCS data path detection algorithms may be used to detect the incoming serial data and map that data to the associated protocol.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a Physical layer device (PHY) 100. PHY 100 is capable of performing auto-negotiation as described in greater detail in CL73. PHY 100 is implemented with a parallel detection architecture that is operable over different data rates (e.g., speeds). PHY 100 is capable of performing auto-negotiation supporting different data rates using a single PMA/PMD lane. That is, the data path within PHY 100 uses a single PMA and a single PMD. In an example implementation, PHY 100 is implemented in an IC. The IC may be a programmable IC, a System-on-Chip, an application-specific IC (ASIC), or other type of IC. The IC may, in turn, be incorporated into a larger system. For purposes of discussion, an IC or other system including PHY 100 is referred to as a "local device". The device with which the local device is attempting to establish an Ethernet communication link is called the "link partner".

CL73 allows a device to advertise enhanced modes of operation possessed by the device to another device over an Ethernet communication channel. This allows the device to detect corresponding enhanced operational modes that are implemented by the other device. This exchange of information, referred to as auto-negotiation, allows the two devices to automatically configure themselves to take maximum advantage of the capabilities of both devices. Operational modes not shared by both devices are rejected. CL73 does not guarantee that a compatible mode of operation will result in a communication link being established or maintained.

In the example of FIG. 1, PHY 100 may couple to a Media Dependent Interface (MDI) 102 and a Media Independent Interface (MII) 104. MII 104 may be a Gigabit MII (GMII), a 100 Gb/s MII (CGMII), a 10 Gb/s MII (XGMII), or a 40 Gb/s MII (XLGMII). MDI 102 may couple to a medium 106. MII 104 may couple to a reconciliation sub-layer 108 and to a MAC and one or more higher layers 110 of the Open Systems Interconnect (OSI) reference model. In general, PHY 100, MDI 102, MII 104, and reconciliation sub-layer 108 correspond to the physical layer of the International Organization for Standardization (ISO)/International Electrotechnical Commission (IEC) OSI reference model. The MAC and higher layers 110 correspond to the data link layer of the OSI reference model.

PHY 100 may include an auto-negotiation circuit 120, a PMD circuit 122, a PMA circuit 124, and one or more PCS circuits 126 (e.g., shown as 126-1 through 126-N). PMD circuit 122 may include a receiver 128 (labeled "RX" in FIG. 1) and a transmitter 130 (labeled "TX" in FIG. 1).

Auto-negotiation circuit 120 is configured to implement a state machine that supports auto-negotiation with a parallel detection architecture using a data lane including a single PMA circuit and a single PMD circuit. In this regard, the state machine is modified in comparison to the standard state machine defined in CL73. The modified state machine implemented by auto-negotiation circuit 120 includes additional states that allow reconfiguration of aspects of PMD circuit 122 over time to accommodate different communication protocols and different data rates for such communication protocols. In general, PMD circuit 122 is reconfigured to operate at different data rates in order to determine whether a link partner (e.g., another device to which PHY 100 is connected via medium 106) is compatible with a given communication protocol.

In the example of FIG. 1, auto-negotiation circuit 120, being implemented within a local device, is capable of configuring receiver 128 to operate at different data rates over time in order to find a communication protocol that may be used to establish a communication link with a link partner. Auto-negotiation circuit 120, for example, is capable of providing control signals to receiver 128 for controlling operation thereof. As an example, auto-negotiation circuit 120 may configure receiver 128 to operate at a 10G (10 Gigabit) data rate for a period of time. If no communication link is established at the 10G data rate, auto-negotiation circuit 120 may configure receiver 128 to operate at a 1G (1 Gigabit) data rate for a period of time. If no communication link is established at the 1G rate, auto-negotiation circuit 120 may continue to cycle receiver 128 between the 10G data rate and the 1G data rate as described until a communication link is established.

In cycling the data rate of receiver 128 as described, auto-negotiation circuit 120 is further capable of connecting a particular one of PCS circuits 126 to PMA circuit 124 and, by extension, to PMD circuit 122 (e.g., receiver 128) based on the data rate that is currently implemented. Auto-negotiation circuit 120, for example, may be coupled to PCS circuits 126 via one or more control signals (shown in dashed line) to control operation thereof. PCS circuits 126 are capable of performing functions such as data encoding and decoding, scrambling and descrambling, alignment marker insertion and removal, Forward Error Correction (FEC), block and symbol redistribution, and/or lane block synchronization and deskew. In the example of FIG. 1, each different PCS circuit 126 is capable of performing such functions for a different communication protocol. For example, PCS circuit 126-1 may support 10G Base-R, while PCS circuit 126-N supports 1G. In another example, each PCS circuit 126 may support a set of one or more different communication protocols. The set of communication protocols supported by each PCS 126 may be mutually exclusive. For example, PCS circuit 126-1 may support 10G-Base-R, 10G Base-KR, and 25G, while PCS circuit 126-N may support 1G, 2.5G, and 5G. Each PCS circuit 126, therefore, may be implemented differently based on the particular communication standards supported by that PCS circuit 126. If, for example, auto-negotiation circuit 120 configures receiver 128 to operate at a data rate of 10G, auto-negotiation circuit 120 connects receiver 128 to PCS circuit 126-1. If, for example, auto-negotiation circuit 120 configures receiver 128 to operate at a data rate of 1G, auto-negotiation circuit 120 connects receiver 128 to PCS circuit 126-N.

As defined within this disclosure, the term "connect", as applied to connecting a selected PCS circuit 126 to PMA circuit 124 (and by extension PMD circuit 122 and/or receiver 128), means establishing communication between the selected PCS circuit 126 and PMA circuit 124. When the selected PCS circuit 126 is connected to the PMA circuit 124, the selected PCS circuit 126 is capable of operating on data received from PMA circuit 124 by way of receiver 128 of PMD circuit 122. In one example, communication may be established by enabling (e.g., activating) the selected PCS circuit 126 to process data while the other non-selected PCS circuits 126 are disabled (e.g., deactivated) and do not process data. In another example, communication may be established by allowing data to pass from PMA circuit 124 to the selected PCS circuit 126 while preventing data to pass from PMA circuit 124 to any non-selected PCS circuit 126 (e.g., using a routing switch, crossbar, multiplexer, etc.). In some implementations, non-selected PCS circuits are placed in low power mode, are clock gated, or completely disabled to save power.

PHY 100 provides several benefits over other conventional techniques for implementing auto-negotiation with parallel detection. As illustrated in FIG. 1, PHY 100 may include a single PMD circuit 122 instead of multiple different PMD circuits each supporting a different data rate.

In one aspect, PMD circuit 122 includes a DME decoder circuit 132 that is coupled to and takes inputs from the receiver 128. DME decoder circuit 132 is capable of providing the decoded information to a finite state machine (e.g., described in connection with FIG. 2) in the auto-negotiation circuit 120.

Figure 2:
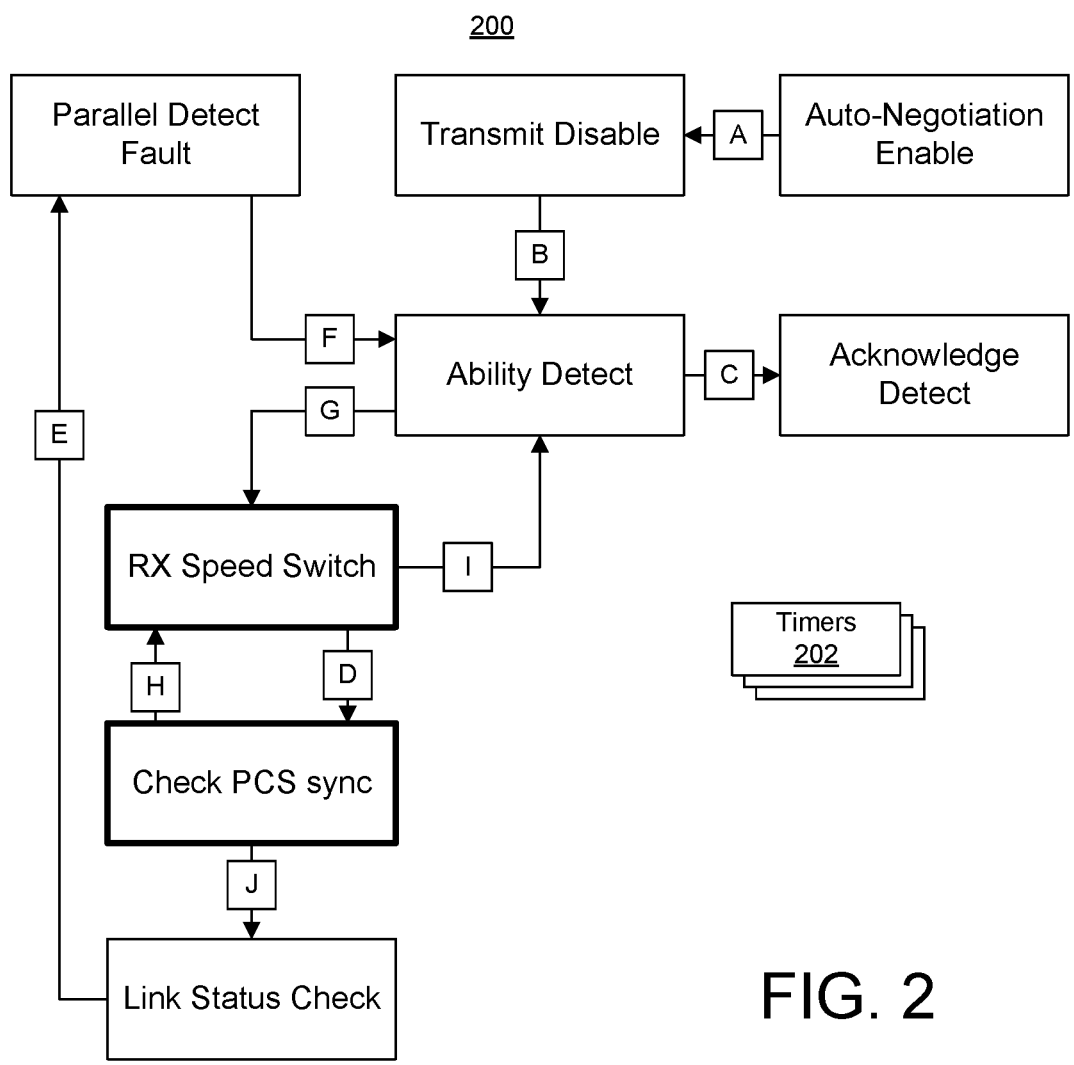
FIG. 2 illustrates an example implementation of a finite state machine for auto-negotiation.

FIG. 2 illustrates an example implementation of a finite state machine (FSM) 200 for auto-negotiation. The example FSM 200 illustrated in FIG. 2 may be implemented by auto-negotiation circuit 120 of FIG. 1. As illustrated, FSM 200 includes a plurality of different states corresponding to the blocks with state transition conditions shown using arrows labeled with letters. FSM 200 further includes a plurality of timers 202 that may be used in determining the state transition conditions.

In general, auto-negotiation circuit 120 is capable of determining a selected communication protocol that is compatible with a link partner device. The selected communication protocol is one that is selected from a plurality of communication protocols. Auto-negotiation circuit 120 is capable of determining compatibility by configuring receiver 128 to operate at different data rates over time, the different data rates corresponding to different ones of the plurality of communication protocols. Compatibility may be determined, for example, by detecting SYNC, DME pages, and/or establishing a communication link between the local device and the link partner.

For purposes of illustration, timers 202 may include the following timers:
    break_link_timer: 60 ms-75 ms
    autoneg_wait_timer: 25 ms-50 ms
    legacy_check_timer: 50 ms+delta
    dme_page_detect_timer: 500 ms
The delta in the legacy_check_timer, as described herein in greater detail below, is used to ensure that the two devices attempting to establish a communication link operate with different wait times.

While the timers listed above may be set using the above-referenced time windows, it should be appreciated that the time windows provided are for purposes of illustration only. In accordance with the example implementations described herein, the timers may be programmed with other user-specified time values. As an illustrative example, PHY 100 described in connection with FIG. 1 may be specified as an Intellectual Property (IP) core. In that case, the values used by the various timers may be user-specified prior to implementation of the IP core in an IC.

The conditions associated with the different state transition labels used in FIG. 2 are described below:
    A: mr_autoneg_enable=true
    B: break_link_timer_done
    C: ability_match=true AND nonce_match=false
    D: all_legacy_devices_checked=false
    E: single_link_ready=false
    F: Un-Conditional Transition
    G: dme_page_detect_timer_done
    H: legacy_check_timer_done
    I: legacy_check_timer_done AND all_legacy_devices_checked=true
    J: link_status_[KX]=OK+link_status_[KX4]=OK In the example of FIG. 2, after the device is powered on, FSM 200 moves to the auto-negotiation enable state. When state transition condition A is met (e.g., where auto-negotiation is enabled), FSM 200 moves to the transmit disable state. In response to state transition condition B being met (e.g., expiration of the break_link_timer corresponding to break_link_timer_done), FSM 200 moves to the ability detect state. By the time FSM 200 is in the ability detect state, FSM 200 has configured receiver 128 to operate at a data rate of 10 Gigabits per second (e.g., 10G). FSM 200 further has connected an appropriate PCS 126 to receiver 128. FSM 200 is capable of starting the dme_page_detect_timer in response to entering the ability detect state.

In conventional PHYs, the FSM waits indefinitely in the ability detect state. The FSM moves from the ability detect state directly to the link status check state in response to detecting state transition condition J (corresponding to link_status_[KX]=OK+link_status_[KX4]=OK) or directly to the acknowledge detect state in response to detecting the state transition condition C (corresponding to ability_match=true AND nonce_match=false). Regarding condition C, CL73 specifies that a nonce match be used to support the auto-negotiation feature at higher rates. When, for example, a local device sends the serial data on the line, the same data may be bounced back to the local device (e.g., the sender) in some cases due to operation of some analog circuitry. To avoid a false link being established by the local device detecting the local device's own data bouncing back, a nonce match is used. The NONCE field in the DME page is unique for any two users participating in auto-negotiation. Otherwise, the protocol treats both users as one, which indicates that the local device is receiving the local device's own data bounced back.

In accordance with the example implementations described herein, FSM 200 waits for a programmable timer referred to as the "dme_page_detect_timer" to expire. The programmable timer may be set to a value such as, for example 500 ms. If PHY 100 finds DME ability match prior to expiration of the programmable timer, corresponding to state transition C, FSM 200 moves to the acknowledge detect state. If PHY 100 does not find DME ability match prior to expiration of the programmable timer, FSM 200 moves to one of two additional states included in FSM 200, which are not included in conventional FSM implementations.

The two additional states included in FSM 200 are RX speed switch state and check PCS sync state, each shown with bold outline in FIG. 2. These two additional states are inserted between the ability detect state and the link status check state. The two additional states support one or more variants of link partner configurations and allow PHY 100 to detect legacy Ethernet devices (e.g., legacy protocols) in serial with DME decoding. The serial detection may be performed in a round robin fashion instead of in parallel with DME decoding. PHY 100 is capable of detecting legacy Ethernet devices serially in round robin fashion without violating (e.g., while remaining compliant with) CL73.

In the example of FIG. 2, subsequent to expiration of the dme_page_detect_timer without having detected any DME pages (corresponding to state change condition G), FSM 200 continues to the RX speech switch state. In the RX speed switch state, FSM 200 is capable of configuring receiver 128 to operate at a different data rate. In the RX speech switch state, MGTs in receiver 128 are configured to operate at one of the legacy protocol speeds. The MGTs in receiver 128 may also be configured to perform (and switch between performing) other operations such as, for example, 8b10b encoding/decoding, 64b66b encoding/decoding and/or Asynchronous Gearbox, elastic buffering, etc., based on the particular protocol to be detected.

FSM 200 loops back to the ability detect state in response to detecting state change condition I or continues to the check PCS sync state in response to detecting state change condition D. State change condition I indicates that the legacy_check_timer has expired and all legacy devices (e.g., all legacy communication protocols supported by PHY 100) have been checked. State change condition D indicates that while the legacy_check_timer has expired, not all of the legacy devices have been checked.

In response to detecting state change condition D, FSM 200 continues to the check PCS sync state. In the check PCS sync state, FSM 200 enables the appropriate PCS circuit to detect the SYNC pattern. FSM 200 is capable of connecting receiver 128 to the particular PCS circuit associated with the data rate, or speed, at which receiver 128 is configured to operate. For example, FSM 200 may configure receiver 128 to operate at a data rate of 1G and couple receiver 128 to a PCS circuit for the 1G data rate.

In the check PCS sync state, FSM 200 checks whether SYNC has been received by receiver 128. For example, FSM 200 checks whether the connected PCS circuit has detected SYNC via receiver 128 in the check PCS sync state. In response to detecting state change condition H, FSM 200 loops back to the RX speed switch state. State change condition H indicates that the legacy_check_timer has expired without detecting SYNC. FSM 200 is capable of iterating between the RX speed switch state and the check PCS sync state until such time that either all of the legacy devices have been checked (e.g., without detecting SYNC) at which point FSM 200 loops back to the ability detect state corresponding to state change condition I, or SYNC is detected corresponding to state change condition J, at which point FSM 200 continues to the link status check state. State change condition J (e.g., link_status_[KX]=OK+link_status_[KX4]=OK) indicates that FSM 200 has detected a SYNC pattern prior to expiration of the legacy_check_timer. The timer may be reset after each iteration. After FSM 200 reaches the link_status_check state, FSM 200 waits for autoneg_wait_timer_done and single_link_ready as is the case for conventional FSMs.

Accordingly, FSM 200 may continue to the parallel detect fault state from the link status check state in response to detecting state change condition E. State change condition E indicates that the single_link_ready is false. FSM 200 continues to the ability detect state from the parallel detect fault state in response to detecting state change condition F, indicating an unconditional transition. The single_link_ready is false if multiple links are found or if no link is found. The parallel detect fault state indicates the parallel detection fault (e.g., spurious link up) status.

In the example of FIG. 2, the RX speed switch and check PCS sync states have been added to change the speed of the MGTs used to implement receiver 128, which implements a serial data path. The two states further allow auto-negotiation circuit 120 to direct data received by receiver 128 to the appropriate PCS circuit to acquire the incoming signal. FSM 200 moves to the link status check state in response to the selected PCS circuit coupled to receiver 128 detecting the SYNC pattern in the incoming data.

If the PCS circuit coupled to receiver 128 is unable to detect the SYNC pattern, within the time window, e.g., prior to expiration of the legacy_check_timer, FSM 200 changes the speed of the MGTs in receiver 128 to the next supported protocol. As the speed of the MGTs is changed, FSM 200 connects receiver 128 to the appropriate PCS circuit that supports the updated speed of the MGTs. FSM 200 performs these operations in sequential fashion for all supported legacy devices that do not support CL73 DME encoding/decoding techniques.

It should be appreciated that the particular protocols and/or data rates noted herein are provided for purposes of illustration and not intended as limitations. The PHY architecture described within this disclosure is capable of supporting data rates from 100 Mbps to 25 Gbps Ethernet protocols.

Figure 3:
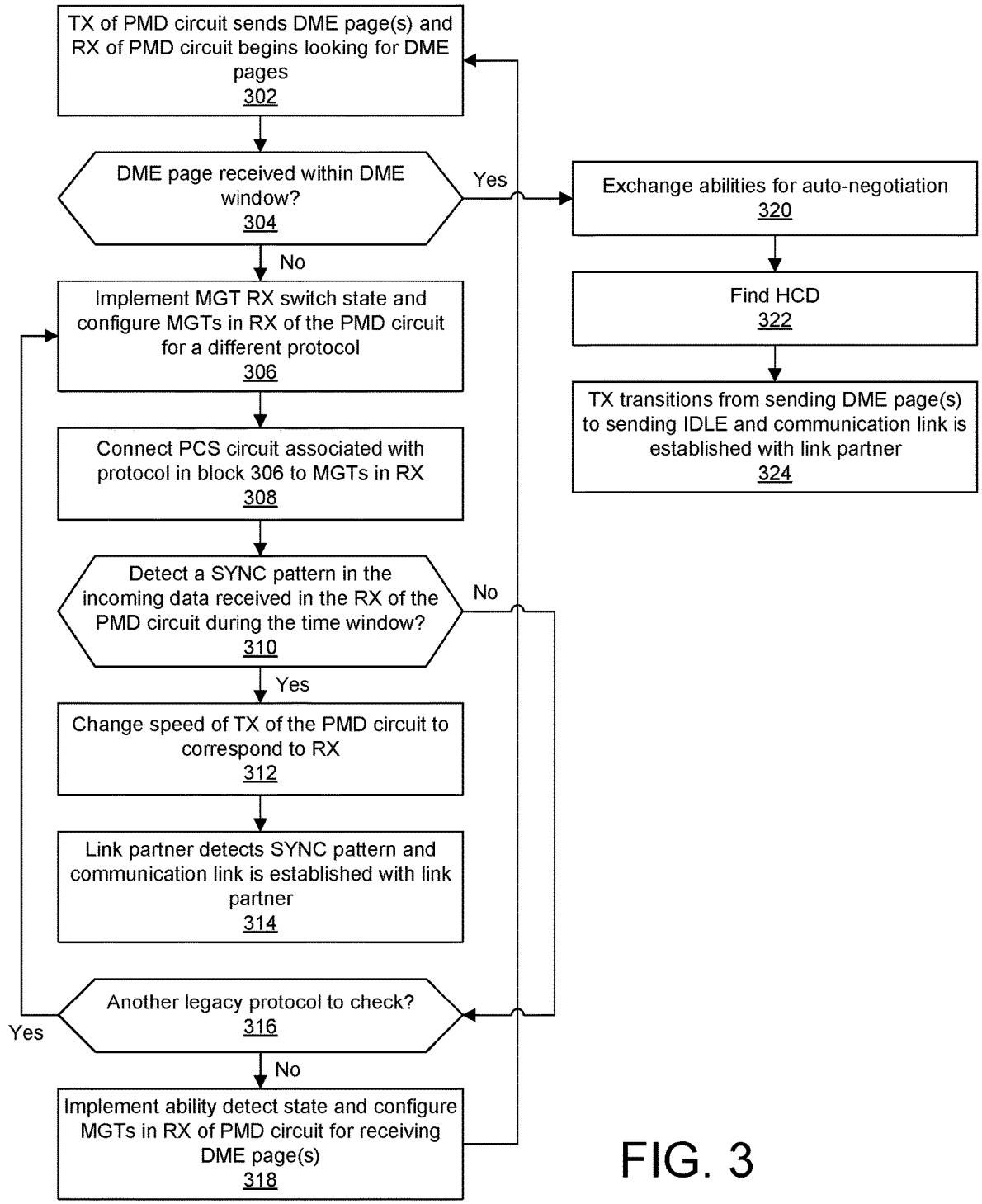
FIG. 3 illustrates an example method of auto-negotiation with parallel detection for different data rates.

FIG. 3 illustrates an example method 300 of auto-negotiation with parallel detection for different data rates. Method 300 may be performed by a local device that includes or implements the architecture described in connection with FIGS. 1-2. Method 300 describes a process in which the local device is attempting to establish a communication link with a link partner over Ethernet.

In block 302, the transmitter of the local device begins sending DME pages. Further, the receiver of the local device begins looking, or monitoring, for received DME pages. In block 302, the PMD circuit of the local device that is capable of detecting DME pages is coupled to the receiver. For example, the auto-negotiation circuit is capable of coupling the PMD circuit configured to detect DME pages to the receiver. In one aspect, for example, the PMD includes a DME decoder circuit that is coupled to and takes inputs from the receiver 128. The DME decoder circuit is capable of providing the decoded information to the FSM 200 in the auto-negotiation circuit 120. In another aspect, a selected PCS circuit may provide block lock/SYNC indication to FSM 200.

In block 304, the local device determines whether a DME page or DME pages have been detected within the DME window. The DME window may be the timer period defined by the dme_page_detect_timer.

In response to detecting a DME page or DME pages within the DME window, method 300 continues to block 320. In block 320, the auto-negotiation circuit causes the local device to exchange abilities with the link partner for performing auto-negotiation in accordance with CL73. In block 322, the local device finds the highest common denominator (HCD) technology. In block 324, the transmitter of the local device transitions from sending DME page(s) to sending IDLE and a communication link is established with the link partner.

In response to the DME window expiring without detecting a DME page, method 300 continues to block 306. In block 306, the auto-negotiation circuit implements the RX speed switch state and configures the MGTs in the receiver of the PMD circuit for a different protocol. The different protocol entails the MGTs in the receiver of the local device operating at a different speed. For example, the MGTs may be configured to operate at 1G. In block 308, the auto-negotiation circuit of the local device connects the PCS circuit associated with the different protocol of block 306 to the MGTs in the receiver of the local device.

In block 310, the auto-negotiation circuit determines whether the PCS circuit detects a SYNC pattern in the incoming data received in the receiver of the PMD circuit during the legacy time window. The legacy time window may be defined by the legacy_check_timer.

In response to detecting a SYNC pattern in the incoming data signal during the legacy time window, method 300 continues to block 312. In block 312, the auto-negotiation circuit changes the speed of the transmitter of the PMD circuit to correspond to, or match, the speed of the receiver of the PMD circuit. For example, the auto-negotiation circuit changes the speed of the transmitter to the same speed as the receiver. Further, the transmitter begins sending a SYNC pattern at the newly configured speed. In block 314, the link partner detects the SYNC code from the transmitter and the communication link is established. After block 314, method 300 may end.

Referring again to block 310, in response to the legacy time window expiring without detecting a SYNC pattern, method 300 continues to block 316. In block 316, in the case where a SYNC pattern is not detected in the incoming data during the legacy time window, the auto-negotiation circuit determines whether another legacy protocol remains to be checked. In response to determining that one or more legacy protocols remain to be checked, method 300 loops back to block 306 to continue checking such remaining legacy protocols. In response to determining that no further legacy protocols remain to be processed, method 300 continues to block 318.

In block 318, the auto-negotiation circuit implements the ability detect state and configures the MGTs in the receiver of the PMD circuit to receive DME pages. After block 318, method 300 loops back to block 302 to continue processing.

Figure 4:
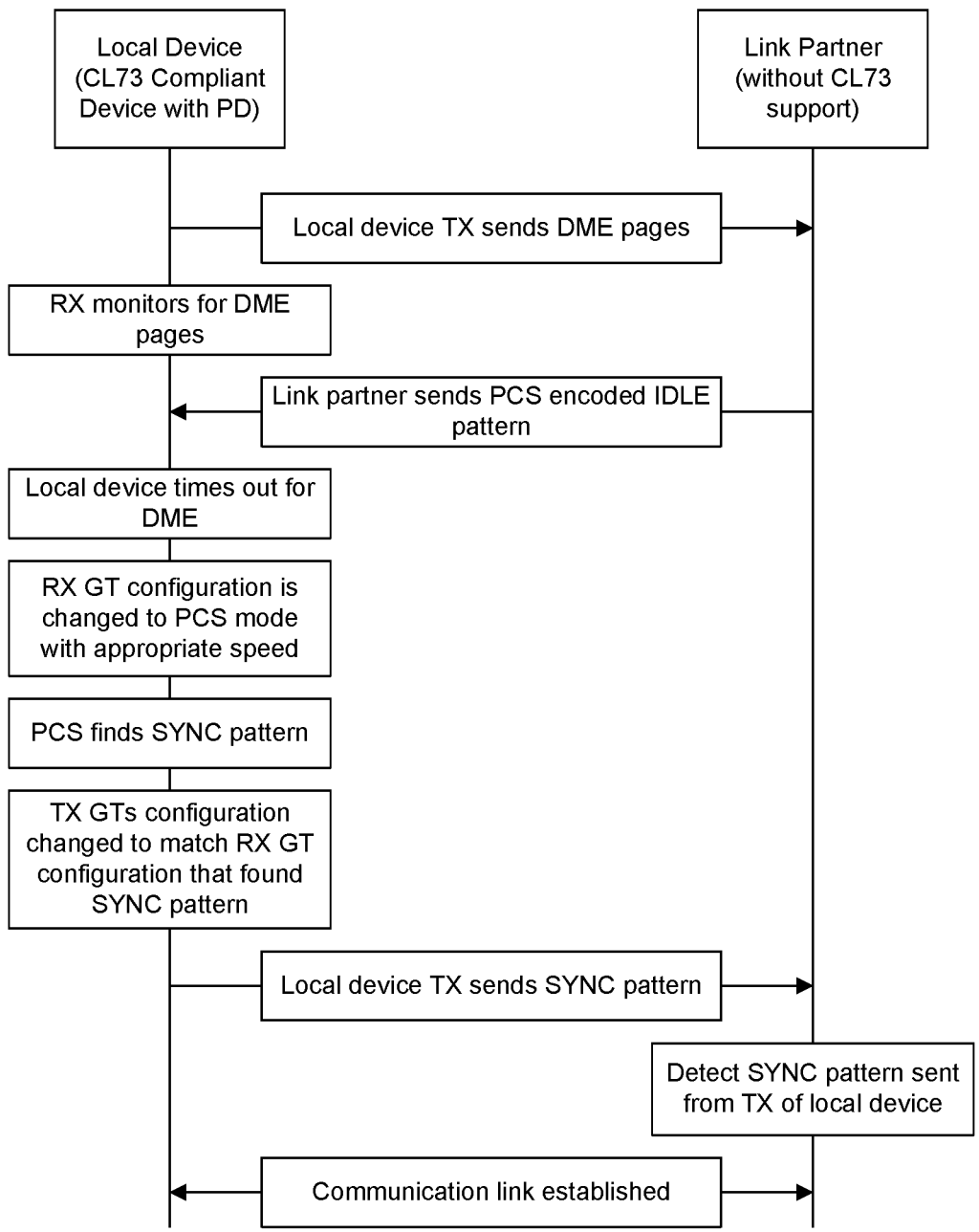
FIG. 4 illustrates an example method of operation for a system as described in connection with FIGS. 1-3.

FIG. 4 illustrates an example method of operation for a system as described in connection with FIGS. 1-3. In the example of FIG. 4, the local device that is CL73 compliant and supports parallel detection includes PHY 100 as described in connection with FIGS. 1-3. The local device is attempting to establish a communication link, e.g., an Ethernet connection, with a link partner. In the example of FIG. 4, the link partner does not support CL73. As an illustrative example, the link partner may be a legacy 1000BASE-KX, 10GBASE-KX4, 10GBASE-R, or 25GBASE-R type of device with such a PHY that does not support CL73 auto-negotiation.

In the example of FIG. 4, the local device transmitter begins sending DME pages while the receiver of the local device begins monitoring for DME pages from the link partner. The link partner sends a PCS encoded IDLE pattern. The local device times out for detecting DME pages. As such, the FSM of the local device changes the MGT configuration of the receiver to a PCS mode with an appropriate speed. Further, an appropriate PCS circuit is connected to the receiver. For example, the FSM configures the MGTs of the receiver to a speed corresponding to a selected legacy protocol and changes the particular PCS circuit that is coupled to the receiver to one that is configured to operate with the selected legacy protocol.

The PCS circuit of the local device finds or detects the SYNC pattern sent by the link partner. In response, the FSM of the local device configures the MGTs of the transmitter to operate at a speed that matches that of the receiver MGTs for which the SYNC pattern was detected. In effect, the FSM of the local device implements a configuration in the MGTs of the transmitter to match the configuration of the MGTs in the receiver that was used to find the SYNC pattern. With the transmitter configured, the transmitter of the local device sends the SYNC pattern. The link partner detects the SYNC pattern sent from the transmitter of the local device. Accordingly, the local device and the link partner establish a communication link.

Figure 5:
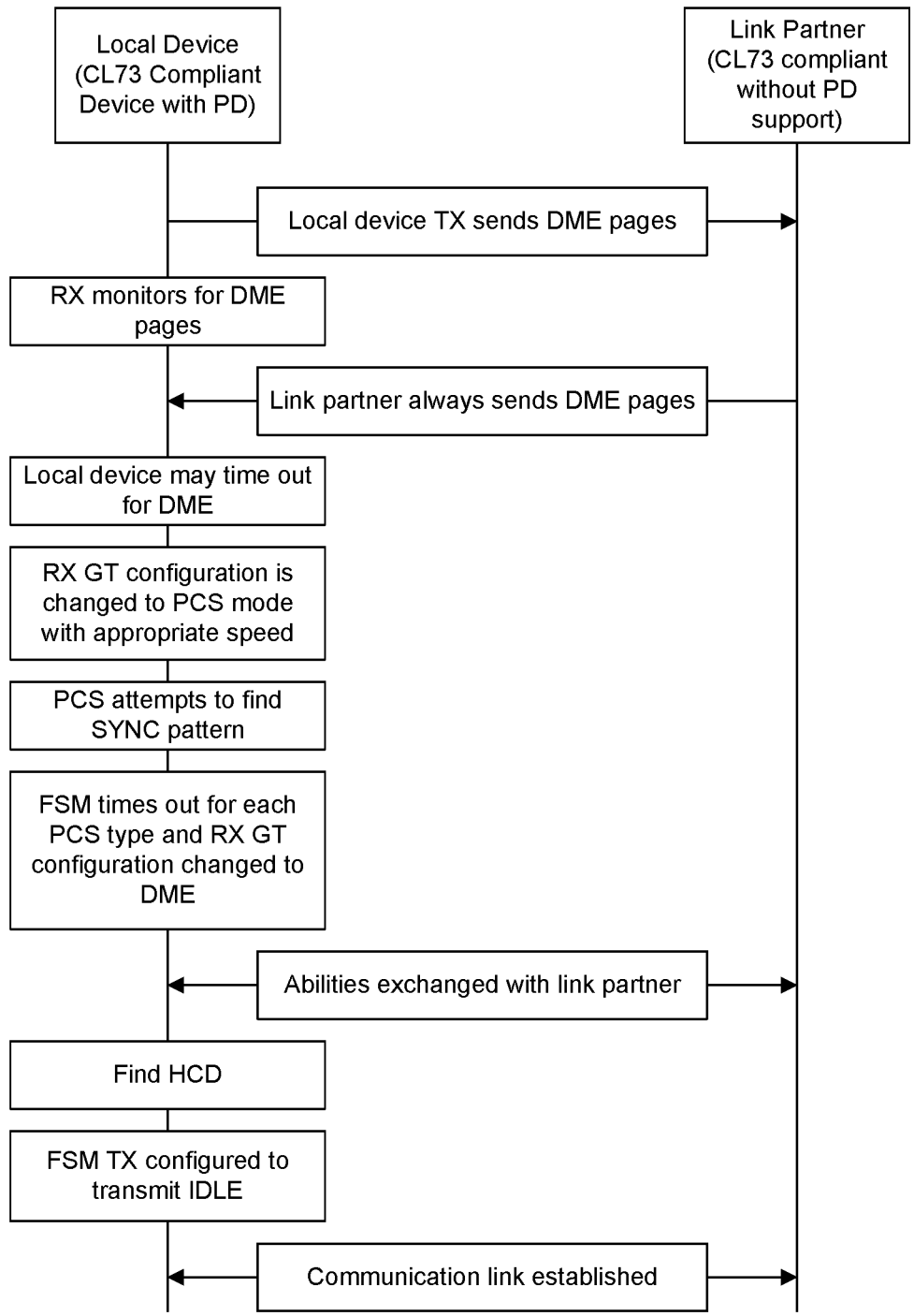
FIG. 5 illustrates another example method of operation for a system as described in connection with FIGS. 1-3.

FIG. 5 illustrates an example method of operation for a system as described in connection with FIGS. 1-3. In the example of FIG. 5, the local device that is CL73 compliant and supports parallel detection includes PHY 100 as described in connection with FIGS. 1-3. The local device is attempting to establish a communication link, e.g., an Ethernet connection, with a link partner. In the example of FIG. 5, the link partner does support CL73, but does not support parallel detection. As an illustrative example, the link partner may be a legacy 10BASE-KR, 25GBASE-CR/CR-S, or 25GBASE-KR/KR—S type of device with such a PHY that does supports CL73 auto-negotiation, but not parallel detection.

In the example of FIG. 5, the local device transmitter begins sending DME pages while the receiver of the local device begins monitoring for DME pages from the link partner. The link partner sends DME pages. In some cases, the local device may detect the DME pages initially without cycling through legacy protocols to detect the SYNC pattern. This may depend on the timing of each of the local device and the link partner being turned on. The example of FIG. 5 illustrates the case where the local device does not initially detect the DME pages from the link partner and, in response, cycles through the legacy protocols in an effort to detect the SYNC pattern. Depending upon the relative timing and/or synchronization of the state machines of the local device and the link partner, however, the local device, in response to detecting DME pages from the link partner, may proceed directly to "abilities exchanged with link partner".

Accordingly, as pictured in FIG. 5, the local device times out for detecting DME pages. As such, the FSM of the local device changes the MGT configuration of the receiver to a PCS mode with an appropriate speed. Further, an appropriate PCS circuit is connected to the receiver. For example, the FSM configures the MGTs of the receiver to a speed corresponding to a selected legacy protocol and changes the particular PCS circuit that is coupled to the receiver to one that is configured to operate with the selected legacy protocol. Since the link partner is not sending the SYNC pattern, the local device cycles through each of the legacy protocols that the PHY therein is capable of detecting.

If no SYNC pattern is detected for any of the legacy protocols (e.g., in the various PCS modes), the FSM changes the configuration of the MGTs in the receiver of the local device to DME. In response to each of the local device and the link partner detecting DME pages from the other, the local device and the link partner exchange abilities and find the HCD. The FSM of the local device configures the transmitter to transmit IDLE and a communication link is established between the local device and the link partner.

Figure 6:
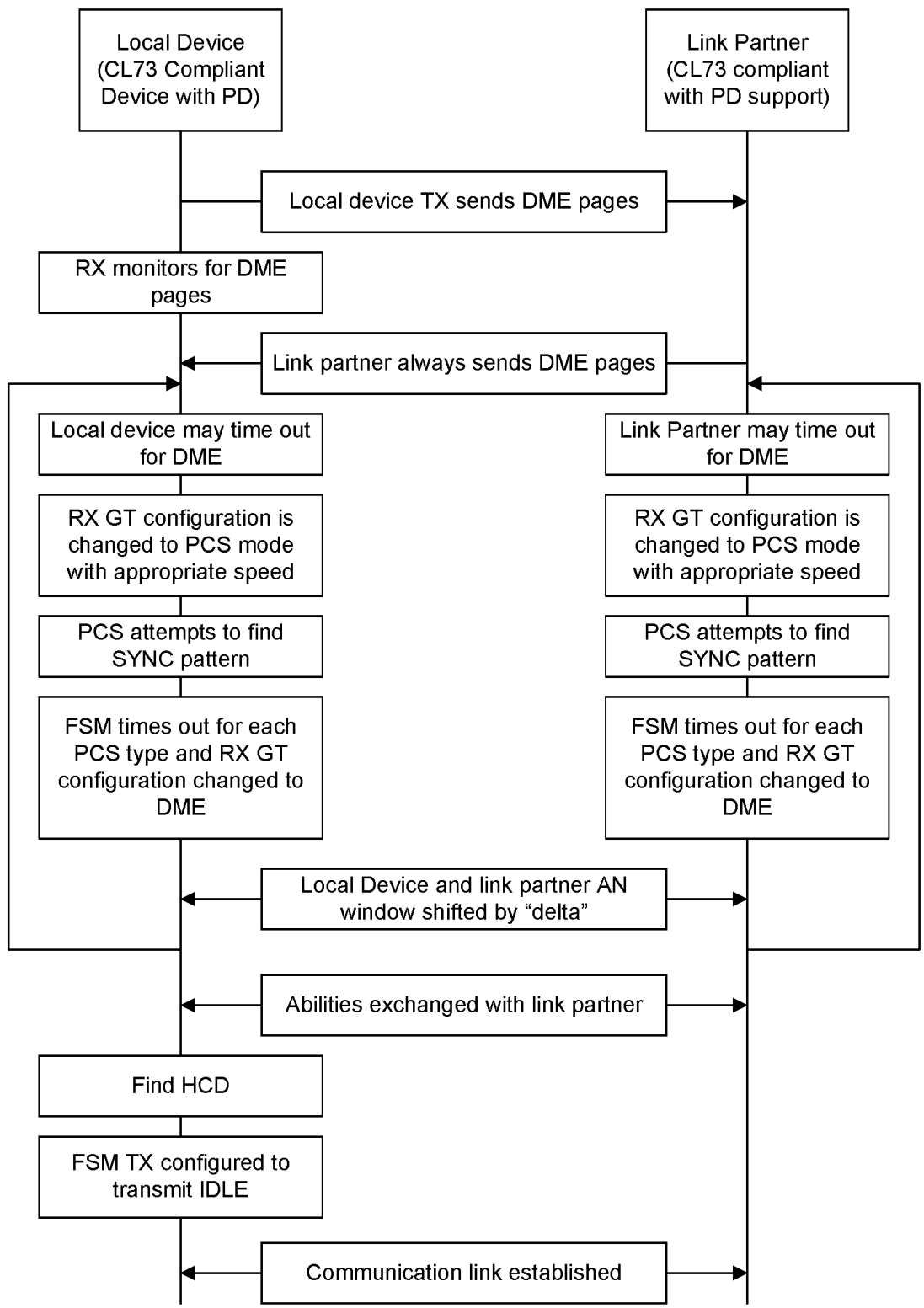
FIG. 6 illustrates another example method of operation for a system as described in connection with FIGS. 1-3.

FIG. 6 illustrates an example method of operation for a system as described in connection with FIGS. 1-3. In the example of FIG. 6, the local device that is CL73 compliant and supports parallel detection includes PHY 100 as described in connection with FIGS. 1-3. The link partner device may also be CL73 compliant and support parallel detection. For example, the link partner device may include a PHY 100 as described herein. The local device is attempting to establish a communication link, e.g., an Ethernet connection, with a link partner. In the example of FIG. 6, the link partner supports CL73 and parallel detection. As an illustrative example, the link partner may be a legacy 10BASE-KR, 25GBASE-CR/CR-S, or 25GBASE-KR/KR—S type of device with such a PHY that supports CL73 auto-negotiation and parallel detection.

In the example of FIG. 6, the local device transmitter begins sending DME pages while the receiver of the local device begins monitoring for DME pages from the link partner. The link partner sends DME pages. In some cases, the local device may detect the DME pages initially without cycling through legacy protocols to detect the SYNC pattern. This may depend on the timing of each of the local device and the link partner being turned on. The example of FIG. 6 illustrates the case where the local device does not initially detect the DME pages from the link partner and, in response, cycles through the legacy protocols in an effort to detect the SYNC pattern. Similarly, the link partner does not initially detect the DME pages from the local device and, in response, cycles through the legacy protocols in an effort to detect the SYNC pattern. Depending upon the relative timing and/or synchronization of the state machines of the local device and the link partner, however, the local device, in response to detecting DME pages from the link partner, may proceed directly to "abilities exchanged with link partner".

Accordingly, as pictured in FIG. 6, the local device and the link partner each time out for detecting DME pages. As such, the FSM of the local device and the FSM of the link partner change the MGT configuration of the respective receivers to a PCS mode with an appropriate speed. Further, an appropriate PCS circuit is connected to the receiver of the local device. For example, the FSMs of the local device and the link partner configure the MGTs of the receiver to a speed corresponding to a selected legacy protocol and change the particular PCS circuit that is coupled to the receiver of each respective device to one that is configured to operate with the selected legacy protocol. Since the link partner is not sending the SYNC pattern, the local device cycles through each of the legacy protocols that the PHY therein is capable of detecting. Similarly, the link partner would also cycle through the legacy rates. At some point, however, due to the delta delay added to the legacy_check_timer, there would be a window where DME detection for both link partner and local device would align.

If no SYNC pattern is detected for any of the legacy protocols (e.g., in the various PCS modes), the FSM of the local device changes the configuration of the MGTs in the receiver to DME. In response to each of the local device and the link partner detecting DME pages from the other, the local device and the link partner exchange abilities and find the HCD. The FSM of the local device configures the transmitter therein to transmit IDLE and a communication link is established between the local device and the link partner.

The examples described above correspond to the case where the transmitter and the receiver SERDES may be controlled independently. In such cases, the clocking of the receiver data path may be changed without affecting the transmitter data path clocking. In cases where this is not the case, the transmitter may be placed in a transmit disable state for the duration of the time that the receiver is searching for PCS circuit specific IDLEs. In the transmit disable state, the transmitter may transmit 0s continuously or transmit 1s continuously.

The receiver may operate as described above with the exception that the time duration for performing the PCS IDLE check for each PCS circuit type will differ. In such an implementation, the number of iterations to find the HCD will be increased when both the local device and the link partner are of same devices or of similar kind of implementation where the parallel detection is implemented in serial as described herein.

For example, when the local device is sending DME pages, the link partner may be a transmit disable state. From that state, the local device may switch to receive IDLES for another legacy protocol while the link partner may begin transmitting DME pages. As such, there may be a situation where the local device is looking for DME pages or other PCS IDLES while the link partner is transmitting in the transmit disable state or vice versa. In such situations, multiple iterations between the ability detect state and the check PCS sync state may occur.

In an example implementation as illustrated in FIG. 6, a delta delay is added to the time window (e.g., the legacy_check_timer) based on a local device nonce value. The nonce value may be a randomly generated number. In one example, the nonce value may be a 5-bit value. In other implementations, the nonce value may be fewer or more bits. Since the local device and the link partner will not have a same nonce value, the local device and the link partner will use different time windows when checking for legacy protocols. The nonce value adds additional delay to the time window for each state transition. As an example, the delay may be calibrated per bit to 5'b00001=1 ms. This creates a moving time window for each PCS circuit to search for IDLE with a different time window for each iteration.

The example implementations described herein provide increased flexibility by allowing a user to program the DME and PCS IDLE wait times (e.g., dme_page_detect_timer and legacy_check_timer, respectively) to reduce the link time. If, for example, the local device can only support 10GBASE-KR and one of the legacy PCS devices, then the dme_page_detect and legacy_check_timer can be set equal to avoid more iterations. If the local device supports more PCS types, the IDLE check time budget can be distributed among the number of PCS device wait timers. Accordingly, if the selected PCS circuit finds PCS IDLES, the FSM is capable of configuring the transmitter to also start sending the same PCS encoded IDLES to establish the communication link. If the selected PCS circuit does not find any type of PCS IDLES even after cycling through all the supported legacy protocols, the FSM is capable of switching the receiver back to the DME mode of reception. At that time, the FSM also configures the transmitter to start transmitting DME encoded pages.

Figure 7:
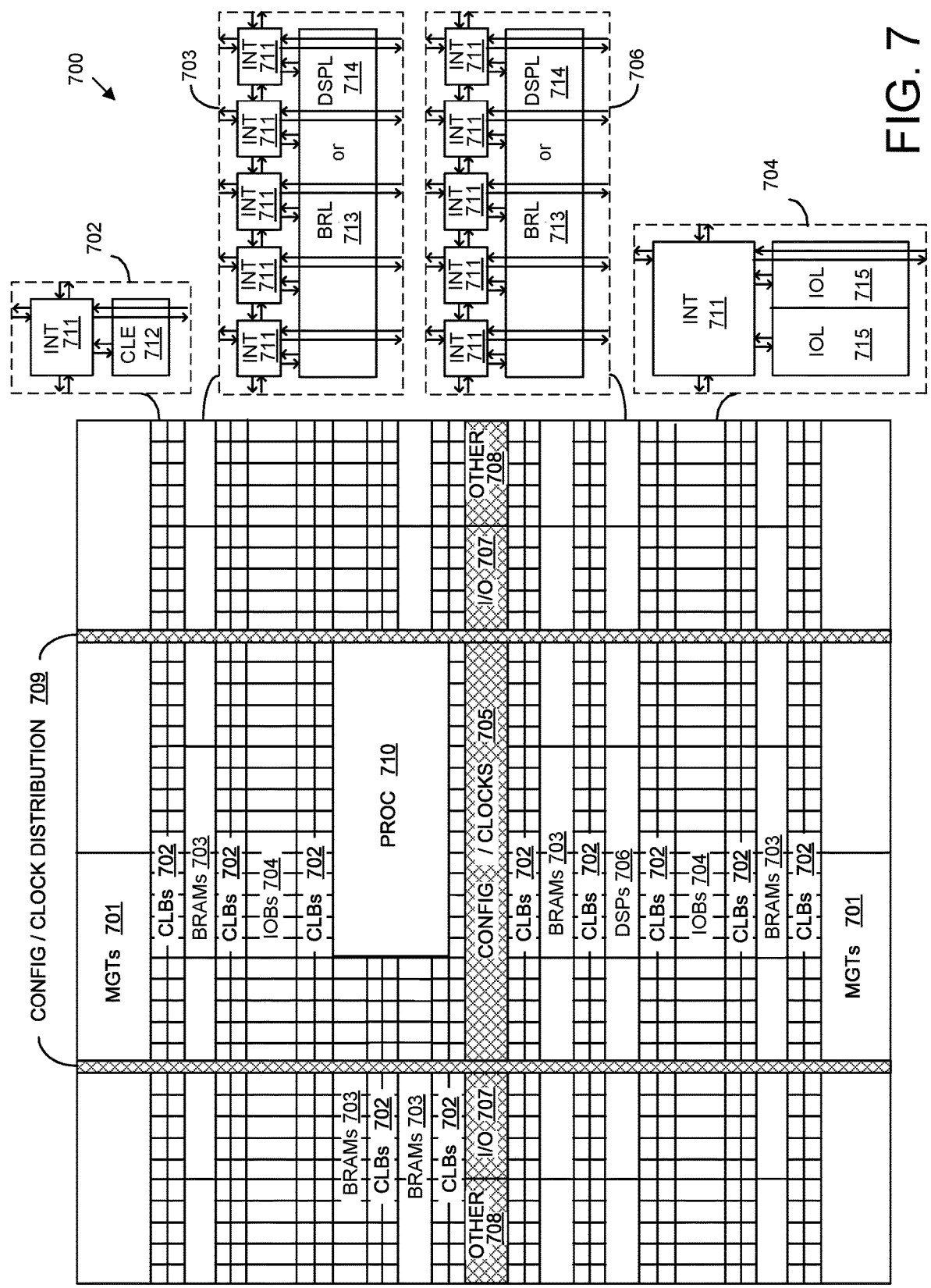
FIG. 7 illustrates an example architecture for an integrated circuit.

FIG. 7 illustrates an example architecture for an integrated circuit (IC). In one aspect, architecture 700 may be implemented within a programmable IC. For example, architecture 700 may be used to implement a field programmable gate array (FPGA). Architecture 700 may also be representative of a system-on-chip (SoC) type of IC. A SoC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 700 includes several different types of programmable circuit, e.g., logic, blocks. For example, architecture 700 may include a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, specialized I/O blocks 707 (e.g., configuration ports and clock ports), and other programmable logic 708 such as digital clock managers, analog-to-digital converters, system monitoring logic, and so forth.

In some ICs, each programmable tile includes a programmable interconnect element (INT) 711 having standardized connections to and from a corresponding INT 711 in each adjacent tile. Therefore, INTs 711, taken together, implement the programmable interconnect structure for the illustrated IC. Each INT 711 also includes the connections to and from the programmable logic element within the same tile, as shown by the examples included at the top of FIG. 7.

For example, a CLB 702 may include a configurable logic element (CLE) 712 that may be programmed to implement user logic plus a single INT 711. A BRAM 703 may include a BRAM logic element (BRL) 713 in addition to one or more INTs 711. Typically, the number of INTs 711 included in a tile depends on the height of the tile. As pictured, a BRAM tile has the same height as five CLBs, but other numbers (e.g., four) also may be used. A DSP tile 706 may include a DSP logic element (DSPL) 714 in addition to an appropriate number of INTs 711. An IOB 704 may include, for example, two instances of an I/O logic element (IOL) 715 in addition to one instance of an INT 711. The actual I/O pads connected to IOL 715 may not be confined to the area of IOL 715.

In the example pictured in FIG. 7, a horizontal area near the center of the die, e.g., formed of regions 705, 707, and 708, may be used for configuration, clock, and other control logic. Vertical areas 709 extending from this column may be used to distribute the clocks and configuration signals across the breadth of the programmable IC.

Some ICs utilizing the architecture illustrated in FIG. 7 include additional logic blocks that disrupt the regular columnar structure making up a large part of the IC. The additional logic blocks may be programmable blocks and/or dedicated circuitry. For example, a processor block depicted as PROC 710 spans several columns of CLBs and BRAMs.

In one aspect, PROC 710 may be implemented as dedicated circuitry, e.g., as a hardwired processor, that is fabricated as part of the die that implements the programmable circuitry of the IC. PROC 710 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 710 may be omitted from architecture 700 and replaced with one or more of the other varieties of the programmable blocks described. Further, such blocks may be utilized to form a "soft processor" in that the various blocks of programmable circuitry may be used to form a processor that can execute program code as is the case with PROC 710.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 7 that are external to PROC 710 such as CLBs 702 and BRAMs 703 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 710.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of a SoC, the configuration bitstream may specify the circuitry that is to be implemented within the programmable circuitry and the program code that is to be executed by PROC 710 or a soft processor. In some cases, architecture 700 includes a dedicated configuration processor that loads the configuration bitstream to the appropriate configuration memory and/or processor memory. The dedicated configuration processor does not execute user-specified program code. In other cases, architecture 700 may utilize PROC 710 to receive the configuration bitstream, load the configuration bitstream into appropriate configuration memory, and/or extract program code for execution.

FIG. 7 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 7 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 710 within the IC are for purposes of illustration only and are not intended as limitations.

In an example implementation, PHY 100, as described herein, may be implemented in an IC having an architecture the same as or similar to that illustrated in FIG. 7. The IC, for example, may implement a local device. PHY 100 may be specified as an Intellectual Property (IP) core that may be implemented in programmable circuitry of the IC. The MGTs described herein in connection with FIG. 7 may be used to implement the receivers and the transmitters of PHY 100. In particular examples, PHY 100, being specified as a core, may be incorporated into a user's circuit design. The user's circuit design may undergo synthesis, placement, routing, and/or bitstream generation resulting in a configuration bitstream that may be loaded into an IC having an architecture the same as or similar to that of FIG. 7. In another example implementation, PHY 100 may be implemented using hardened circuitry that is configurable in the manner described herein in connection with FIGS. 1-6. In any case, the example implementations described herein contemplate physical implementation of the PHY described within this disclosure in any of a variety of different types of ICs.

Figure 8:
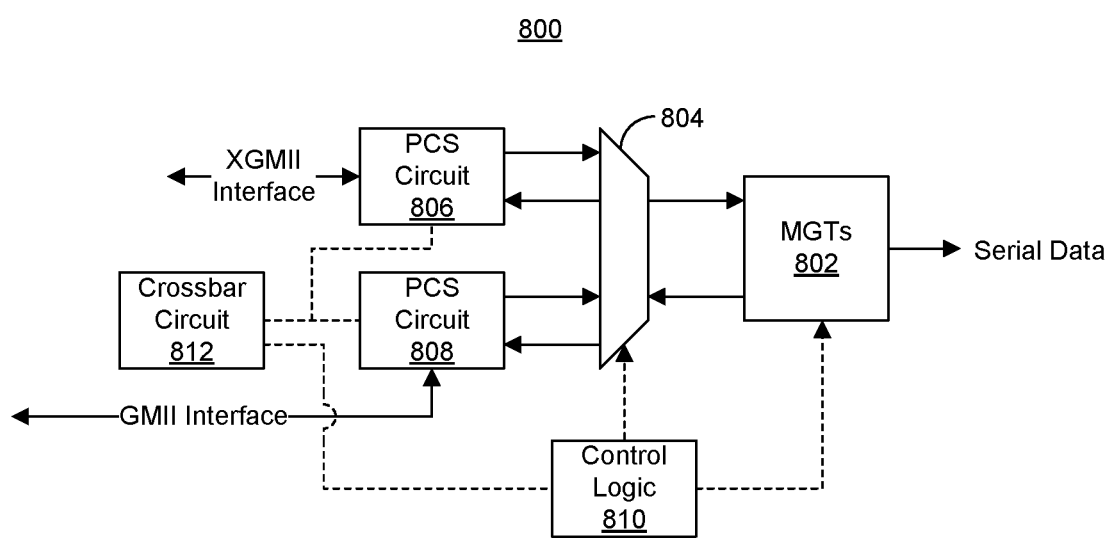
FIG. 8 illustrates an example implementation of a Physical Layer (PHY).

FIG. 8 illustrates an example implementation of a PHY 800. The example of FIG. 8 may be implemented in an IC the same as or similar to that described in connection with FIG. 7. In the example of FIG. 8, PHY 800 includes a plurality of MGTs 802 that may be distributed among the transmitter and receiver of the PMD circuit. SERDES/Multiplexer 804 is coupled to MGTs 802 and may be included in the PMA circuit. As illustrated, SERDES/Multiplexer 804 is coupled to PCS circuits 806 and 808. Control logic 810 is capable of controlling whether PCS circuit 806 or PCS circuit 808 is connected to MGTs 802 via SERDES/Multiplexer 804 and further controlling PCS circuits 806 and 808. Control signals are shown with dashed lines.

In the example of FIG. 8, the two PCS circuits 806 and 808 are controlled via a single control interface. An example of such a control interface is an AXILite interface, though the examples described herein are not intended to be limited by the particular type and/or protocol of control interface used. Crossbar circuit 812 allows both PCS circuits 806 and 808 to be controlled via the same, e.g., a single, master interface control controlling two slave interfaces with different base addresses. In other example implementations, each PCS circuit may be implemented with its own independent control interface without crossbar circuit 812.

In one or more aspects, control logic 810 is capable of controlling operating parameters of the MGTs 802. For purposes of illustration, the following is a non-exhaustive list of operating parameters of MGTs 802 that may be controlled and dynamically changed by control logic 810 during operation and over time: clocking parameters of MGTs, Gear Box parameters of MGTs, encoding/decoding parameters of MGTs, data width parameters of MGTs, and data alignment parameters of MGTs. It should be appreciated that control circuitry 810 is capable of changing any of the available operating parameters of MGTs 802 over time dynamically.

As discussed within this disclosure, the example PHY architecture described herein provides a generic solution to connect a local device that supports CL73 auto-negotiation to devices that do not support CL73 auto-negotiation with parallel detection and/or devices that do support CL73 auto-negotiation through DME encoding/decoding up to 25 Gbps. The example implementations described herein are capable of supporting multiple speeds without using multiple PMA circuits. Further, the overhead, e.g., usage of resources in the IC in which the PHY is implemented, is small including any control circuitry that may be implemented to change configuration of the MGTs "on the fly" without loading new configuration data into the programmable IC. The example architectures described herein allow PCS IPs from different vendors to be included and used in the data path without modifications to detect whether the incoming data belongs to the particular PCS IP.

The FSM of the auto-negotiation circuit described herein is capable of configurating the MGTs to operate at different data rates "on the fly" or during runtime. That is, with the MGTs implemented in a programmable IC, the programmable IC may be loaded with a configuration bitstream so that a circuit design including the PHY is implemented therein. Once the programmable IC is operating with the circuit design implemented therein, the MGTs can be configured and reconfigured as described within this disclosure through control circuitry loading particular values into control registers. The configuration and/or reconfiguration of the MGTs does not require the loading of new and/or different configuration data into the programmable IC.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the terms "one embodiment," "an embodiment," "one or more embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," and similar language throughout this disclosure may, but do not necessarily, all refer to the same embodiment.

The terms first, second, etc. may be used herein to describe various elements. These elements should not be limited by these terms, as these terms are only used to distinguish one element from another unless stated otherwise or the context clearly indicates otherwise.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems and methods according to various aspects of the inventive arrangements. In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In accordance with the inventive arrangements disclosed herein, a physical (PHY) circuit can include a Physical Medium Dependent (PMD) circuit, the PMD circuit having a receiver and a transmitter, a Physical Medium Attachment (PMA) circuit coupled to the PMD circuit, and a plurality of Physical Coding Sublayer (PCS) circuits coupled to the PMA circuit, wherein each PCS circuit is configured to implement a different communication protocol. The PHY can include an auto-negotiation circuit coupled to the PMD circuit. The auto-negotiation circuit is configured to determine a selected communication protocol compatible with a link partner device from a plurality of communication protocols by configuring the receiver to operate at different data rates over time, the different data rates corresponding to different ones of the plurality of communication protocols.

In another aspect, the auto-negotiation circuit is configured to couple different ones of the plurality of PCS circuits to the receiver based on the data rate at which the receiver is configured to operate at a given time and a corresponding communication protocol of the plurality of communication protocols.

In another aspect, the auto-negotiation circuit is configured to iterate through configuring the receiver to operate at the different data rates over time until compatibility of the link partner device with a selected communication protocol of the plurality of communication protocols is determined.

In another aspect, a time window during which compatibility of the link partner device is detected for at least one of the plurality of communication protocols depends on a generated random number.

In another aspect, the random number is newly generated for each iteration.

In another aspect, the auto-negotiation circuit is configured to determine compatibility of the link partner device with a first communication protocol of the plurality of communication protocols by configuring the receiver to operate at a first data rate corresponding to the first communication protocol and connecting a first PCS circuit to the receiver; and, monitoring for receipt of a DME page by the receiver during a first time window corresponding to the first communication protocol using the first PCS circuit.

In another aspect, the auto-negotiation circuit is configured to determine compatibility of the link partner device with a second communication protocol of the plurality of communication protocols by, in response to expiration of the first time window without detecting a DME page, configuring the receiver to operate at a second data rate corresponding to the second communication protocol and connecting a second PCS circuit corresponding to the second communication protocol to the receiver; and, monitoring for a SYNC received by the receiver during a second time window corresponding to the second communication protocol using the second PCS circuit.

In another aspect, the different data rates include 10G and 1G.

In another aspect, the auto-negotiation circuit is configured to, in response to detecting compatibility of the link partner device with a selected communication protocol of the plurality of communication protocols, configure the transmitter to operate at the data rate corresponding to the selected communication protocol.

In another aspect, the transmitter is disabled until compatibility of the link partner device with a selected protocol of the plurality of communication protocols is determined.

In another aspect, the PHY circuit is included within an integrated circuit.

In another aspect, the integrated circuit is a programmable integrated circuit.

In accordance with the inventive arrangements disclosed herein, a method of establishing a communication link implemented by a device can include configuring a receiver to operate at a first data rate corresponding to a first communication protocol of a plurality of communication protocols and connecting a first Physical Coding Sublayer (PCS) circuit to the receiver. The method can include monitoring for receipt of a differential Manchester encoded (DME) page by the receiver during a first time window corresponding to the first communication protocol using the first PCS circuit. The method can include, in response to expiration of the first time window without detecting a DME page, configuring the receiver to operate at a second data rate corresponding to a second communication protocol of the plurality of communication protocols and connecting a second PCS circuit corresponding to the second communication protocol to the receiver. The method can also include monitoring for a SYNC received by the receiver during a second time window corresponding to the second communication protocol using the second PCS circuit.

In an aspect, the method can include iterating between operating the receiver at the first data rate and monitoring for the receipt of the DME page using the first PCS circuit and operating the receiver at the second data rate while monitoring for receipt of the SYNC using the second PCS circuit until a compatible communication protocol of the plurality of communication protocols is found for a link partner device.

In another aspect, the method can include, in response to expiration of the second time window without detecting the SYNC, configuring the receiver to operate at a third data rate corresponding to a third communication protocol of the plurality of communication protocols and connecting a third PCS circuit corresponding to the third communication protocol to the receiver and monitoring for a SYNC received by the receiver during a third time window corresponding to the third communication protocol using the third PCS circuit.

In another aspect, the second time window depends on a generated random number.

In another aspect, the random number is newly generated for each iteration of the monitoring for the SYNC received by the receiver during the second time window corresponding to the second communication protocol using the second PCS circuit.

In another aspect, the first data rate corresponds to 10G and the second data rate corresponds to 1G.

In another aspect, the method can include, in response to detecting compatibility of a link partner device with a selected communication protocol of the plurality of communication protocols, configuring a transmitter of the device to operate at a data rate corresponding to the selected communication protocol.

In another aspect, the method can include disabling a transmitter of the device until compatibility of a link partner device with a selected protocol of the plurality of communication protocols is determined.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A physical (PHY) circuit, comprising:
a Physical Medium Dependent (PMD) circuit, the PMD circuit having a receiver and a transmitter;
a Physical Medium Attachment (PMA) circuit coupled to the PMD circuit;
a plurality of Physical Coding Sublayer (PCS) circuits coupled to the PMA circuit, wherein each PCS circuit is configured to implement a different communication protocol; and
an auto-negotiation circuit coupled to the PMD circuit, wherein the auto-negotiation circuit is configured to determine a selected communication protocol compatible with a link partner device from a plurality of communication protocols by:
configuring the receiver to operate at a first data rate corresponding to a first communication protocol and connecting the receiver with a first PCS circuit corresponding to the first communication protocol;
in response to determining that the link partner device is incompatible with the first communication protocol during a first time window, configuring the receiver to operate at a second data rate corresponding to a second communication protocol and connecting the receiver with a second PCS circuit corresponding to the second communication protocol; and
monitoring for compatibility of the link partner device with the second communication protocol during a second time window;
wherein the second data rate is different than the first data rate and the second communication protocol is distinct from the first communication protocol.

2. The PHY circuit of claim 1, where the auto-negotiation circuit is configured to couple different ones of the plurality of PCS circuits to the receiver based on the data rate at which the receiver is configured to operate at a given time and a corresponding communication protocol of the plurality of communication protocols.

3. The PHY circuit of claim 1, wherein the auto-negotiation circuit is configured to iterate through configuring the receiver to operate at the different data rates over time until compatibility of the link partner device with a selected communication protocol of the plurality of communication protocols is determined.

4. The PHY circuit of claim 3, wherein a time window during which compatibility of the link partner device is detected for at least one of the plurality of communication protocols depends on a generated random number.

5. The PHY circuit of claim 4, wherein the random number is newly generated for each iteration.

6. The PHY circuit of claim 1, wherein the auto-negotiation circuit is configured to determine compatibility of the link partner device with the first communication protocol of the plurality of communication protocols by
monitoring for receipt of a DME page by the receiver during a first time window corresponding to the first communication protocol using the first PCS circuit.

7. The PHY circuit of claim 6, wherein the auto-negotiation circuit is configured to determine compatibility of the link partner device with the second communication protocol of the plurality of communication protocols by
monitoring for a SYNC received by the receiver during a second time window corresponding to the second communication protocol using the second PCS circuit.

8. The PHY circuit of claim 1, wherein the different data rates include 10G and 1G.

9. The PHY circuit of claim 1, wherein the auto-negotiation circuit is configured to, in response to detecting compatibility of the link partner device with a selected communication protocol of the plurality of communication protocols, configure the transmitter to operate at the data rate corresponding to the selected communication protocol.

10. The PHY circuit of claim 1, wherein the transmitter is disabled until compatibility of the link partner device with a selected protocol of the plurality of communication protocols is determined.

11. The PHY circuit of claim 1, wherein the PHY circuit is included within an integrated circuit.

12. The PHY circuit of claim 11, wherein the integrated circuit is a programmable integrated circuit.

13. A method of establishing a communication link implemented by a device, the method comprising:
configuring a receiver to operate at a first data rate corresponding to a first communication protocol of a plurality of communication protocols and connecting a first Physical Coding Sublayer (PCS) circuit to the receiver;
monitoring for receipt of a differential Manchester encoded (DME) page by the receiver during a first time window corresponding to the first communication protocol using the first PCS circuit;
in response to expiration of the first time window without detecting a DME page, configuring the receiver to operate at a second data rate corresponding to a second communication protocol of the plurality of communication protocols and connecting a second PCS circuit corresponding to the second communication protocol to the receiver; and
monitoring for a SYNC received by the receiver during a second time window corresponding to the second communication protocol using the second PCS circuit.

14. The method of claim 13, further comprising:
iterating between operating the receiver at the first data rate and monitoring for the receipt of the DME page using the first PCS circuit and operating the receiver at the second data rate while monitoring for receipt of the SYNC using the second PCS circuit until a compatible communication protocol of the plurality of communication protocols is found for a link partner device.

15. The method of claim 13, further comprising:
in response to expiration of the second time window without detecting the SYNC, configuring the receiver to operate at a third data rate corresponding to a third communication protocol of the plurality of communication protocols and connecting a third PCS circuit corresponding to the third communication protocol to the receiver; and
monitoring for a SYNC received by the receiver during a third time window corresponding to the third communication protocol using the third PCS circuit.

16. The method of claim 13, wherein the second time window depends on a generated random number.

17. The method of claim 16, wherein the random number is newly generated for each iteration of the monitoring for the SYNC received by the receiver during the second time window corresponding to the second communication protocol using the second PCS circuit.

18. The method of claim 13, wherein the first data rate corresponds to 10G and the second data rate corresponds to 1G.

19. The method of claim 13, further comprising:
in response to detecting compatibility of a link partner device with a selected communication protocol of the plurality of communication protocols, configuring a transmitter of the device to operate at a data rate corresponding to the selected communication protocol.

20. The method of claim 13, further comprising:
disabling a transmitter of the device until compatibility of a link partner device with a selected protocol of the plurality of communication protocols is determined.

* * * * *